United States Patent
Yamashita

(10) Patent No.: US 6,246,287 B1
(45) Date of Patent: Jun. 12, 2001

(54) AMPLIFIER FOR PIEZOELECTRIC ACCELERATION SENSOR

(75) Inventor: Muneharu Yamashita, Toyama-ken (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/525,376

(22) Filed: Mar. 15, 2000

(30) Foreign Application Priority Data

Mar. 17, 1999 (JP) .................................................. 11-071689

(51) Int. Cl.[7] ................................. H03F 1/00; H03F 3/45
(52) U.S. Cl. .............................. 330/174; 330/69; 330/253
(58) Field of Search ............................... 330/69, 174, 253

(56) References Cited

U.S. PATENT DOCUMENTS

| | | | |
|---|---|---|---|
| 4,543,536 | * 9/1985 | Pederson | 330/85 |
| 4,724,702 | * 9/1985 | Hamren | 330/282 |
| 5,638,026 | 6/1997 | Hashimoto | 330/260 |
| 6,104,120 | * 8/2000 | Yamashita | 310/319 |

FOREIGN PATENT DOCUMENTS

| | | |
|---|---|---|
| 4439886 | 9/1995 | (DE) . |
| 0374870 | 6/1990 | (EP) . |
| 2206415 | 1/1989 | (GB) . |

* cited by examiner

Primary Examiner—Benny Lee
Assistant Examiner—Patricia T. Nguyen
(74) Attorney, Agent, or Firm—Ostrolenk, Faber, Gerb & Soffen, LLP

(57) ABSTRACT

An amplifier having an operational amplifier, and in which an output terminal of an acceleration sensor is connected to the non-inverting input terminal of the operational amplifier, a leakage resistor R1 is connected between a non-inverting input terminal and the reference voltage, a first capacitor C1 and a first resistor R2 are connected in series with each other between the inverting input terminal and the reference voltage, first and second voltage dividing resistors are connected in series with each other between the output terminal of the operational amplifier and the reference voltage, and a second resistor R3 and a second capacitor C2 are connected in parallel with each other between the connection point of the voltage dividing resistors and the inverting input terminal, and the relationship $C1 \times R2 < C2 \times R3$ is satisfied.

14 Claims, 4 Drawing Sheets

AMPLIFIER FOR PIEZOELECTRIC ACCELERATION SENSOR

BACKGROUND OF THE INVENTION

1. Field of the Invention

The present invention relates to an amplifier for an acceleration sensor, that is used as being integrated with an air bag device for use in an automobile, and more particularly, to an amplifier for amplifying an output of an acceleration sensor in which a piezoelectric element is used.

2. Description of the Related Art

Conventionally, in an air bag device for use in an automobile, a piezoelectric acceleration sensor is utilized for outputting an actuation signal of the air bag device. That is, by detecting an acceleration that results from a collision and the like of an automobile with an acceleration sensor, the air bag is activated by an output of the acceleration sensor.

In the above-mentioned piezoelectric acceleration sensor, a piezoelectric element is displaced by an acceleration to be applied, and an output voltage that corresponds to a charge generated in the piezoelectric element according to a piezoelectric effect is extracted. In order to amplify this output voltage, conventionally, an amplifier indicated with a dotted line A in FIG. 4 is used.

As shown in FIG. 4, one end of a piezoelectric acceleration sensor 51 is connected to a reference voltage Vr, and the other end thereof is connected to a non-inverting input terminal of a first operational amplifier 52 of a MOS-FET input type. A leakage resistor Ra is connected between the non-inverting input terminal 52 and the reference voltage.

Between the inverting input terminal of the first operational amplifier 52 and the reference voltage, a resistor Rb is connected.

Further, between the output terminal and the inverting input terminal of the first operational amplifier 52, a resistor Rc and a capacitor Ca are connected in parallel to each other. Moreover, the output terminal of the first operational amplifier 52 is connected to a non-inverting input terminal of a second operational amplifier 53 of a MOS-FET input type via a capacitor Cb. A resistor Rd is connected between the reference voltage and the non-inverting input terminal of the second operational amplifier 53. Further, a resistor Re is connected between an output terminal and a inverting input terminal of the second operational amplifier 53. Furthermore, a trimming resistor Rf is connected between the inverting input terminal of the second operational amplifier 53 and the reference voltage.

In the above-mentioned amplifier circuit A, the output terminal of the second operational amplifier 53 is connected to an output terminal 54, and from the output terminal 54, the acceleration sensor 51 outputs an output voltage Vo.

Also, a magnitude of the output voltage Vo is to be adjusted by adjusting a resistance value of the trimming resistor Rf.

In the above-mentioned amplifier circuit A, when a capacitance of the piezoelectric element in the accelerator sensor 51 is Cg, a high pass filter is provided with the capacitance Cg and the leak resistance Ra, and then after having passed through this high pass filter the input voltage Vin is provided to the amplifier A.

A cut-off frequency $FL_1$ according to the above-mentioned high pass filter is represented by the following equation (1).

$$FL_1 = \frac{1}{2 \times \pi} \times \frac{1}{Cq \times Ra} \tag{1}$$

Assuming a gain of the above-mentioned operational amplifier circuit A to be Ag, a cut off frequency of low-frequency band to be $FL_a$ (Hz), and a cut off frequency of high-frequency band to be $FH_a$ (HZ), the gain Ag, the cut off frequency $FL_a$ of low-frequency band and the cut off frequency $FH_a$ of high-frequency band are expressed in the following equations, respectively.

$$Ag = \frac{Vo}{Vin} = \frac{Rb + Rc}{Rb} \times \frac{Rf + Re}{Rf} \tag{2}$$

$$FL_a = \frac{1}{2 \times \pi \times Cb \times Rd} \tag{3}$$

$$FH_a = \frac{1}{2 \times \pi \times Rc \times Ca} \tag{4}$$

Further, the above-mentioned Ag, the low-frequency cut off frequency $FL_a$, and the high-frequency cut off frequency $FH_a$ are set to predetermined values corresponding to the type of the acceleration sensor and/or type of the air bag for use in the automobile. It is also set for the above-mentioned $FL_1$ similarly.

In order to expand the measuring bandwidth, it is desirable to lower for the above-mentioned low-frequency cut off frequency $FL_a$ (Hz). It also holds the same for the above-mentioned $FL_1$.

By having miniaturized the acceleration sensor 51, the piezoelectric element is also made smaller. When making the piezoelectric element smaller, the capacitance Cg of the piezoelectric element also becomes smaller. Accordingly, in order to avoid an increase of the low-frequency cut off frequency, as is evident from the equation (1), a resistance value of the leakage resistor Ra has to be set larger.

The amplifier circuit A has a two-stage configuration circuit using the operational amplifiers 52, 53 of the MOS-FET input type. Herein, an output off set voltage of the operational amplifier 52 is reduced by the capacitor Cb, and a signal component in which the output off set voltage is reduced has been amplified in the post stage section of the amplifier circuit having the operational amplifier 53. However, even if adopting the above-mentioned circuit configuration, which uses the operational amplifiers 52, 53 of the MOS-FET input type of which the bias current is small, it is limited to approximately 10 GΩ for the value of leakage resistor Ra, and the leakage resistor Ra with a larger resistance value than this value could not be used. That is, when using the leakage resistor Ra with more than 10 GΩ, the voltage fluctuation of the operational amplifier 52 becomes larger, thereby making it impossible to secure a large dynamic range.

Further, as for an output signal of the piezoelectric element, it is common to use a charge signal—voltage signal converter that is so-called a charge amplifier, and in that case the capacitance of the piezoelectric element has no influence on the output signal of the piezoelectric element. Thus, it can avoid the above-mentioned problem, but comparing the voltage signal with the charge signal, when using the charge signal, a fluctuation or variation thereof is large, and thus there is a problem such that it is difficult to adjust the charge signal in the circuit.

Moreover, when using the charge signal—voltage signal converter, a number of parts become larger, thereby making the circuit more complicated and bulky.

On the other hand, in the above-described amplifier circuit A, it is hardly affected by a fluctuation of the charge signal, but as described above, it is difficult to implement a further miniaturization of the acceleration sensor. In order to achieve a miniaturization of the acceleration sensor, a high performance such as by using a 2-axis detection system and the like, and a low cost, it is strongly desirable to simplify the configuration of the amplifier. However, in the amplifier circuit A including the above-mentioned two operational amplifiers 52, 53, it is difficult to simplify the circuit, and the number of parts has to be large. Moreover, it requires two expensive operational amplifiers of the MOS-FET input type, which leads to high cost.

SUMMARY OF THE INVENTION

Accordingly, it is an object of the present invention to solve the disadvantages or problems described above, and to provide an amplifier for use in a piezoelectric acceleration sensor, having a relatively simple circuit configuration, capable of reducing the number of parts, and in particular capable of reducing the number of expensive amplifying elements to be used, and further capable of achieving miniaturization and high performance of the acceleration sensor.

The present invention is an amplifier provided with a piezoelectric acceleration sensor for amplifying an output voltage from the piezoelectric acceleration sensor, comprising: an operational amplifier having a non-inverting input terminal that is connected to an output terminal of the acceleration sensor, an inverting input terminal and an output terminal; a leakage resistor R1 connected between the non-inverting input terminal of said operational amplifier and a reference voltage; a first capacitor connected between the inverting input terminal of said operational amplifier and the reference voltage; a resistor R2 connected in series to said first capacitor C1; first and second voltage dividing resistors R4, R5 connected in series with each other, which are provided between the output terminal of said operational amplifier and the reference voltage; and a resistor R3 and a capacitor C2 connected in parallel with each other, which are provided between a connection point of the first and second voltage dividing resistors R4, R5 and the inverting input terminal of said operational amplifier, wherein when values of capacitances of said capacitor C1 and C2, and of resistances of said resistor R2 and R3 are set to be C1, C2, R2 and R3, respectively, the expression C1×R2<C2×R3 is satisfied.

In the amplifier provided in a piezoelectric acceleration sensor according to the present invention, preferably the above-mentioned resistor R4 or R5 is a variable resistor, and by adjusting the resistance values of the resistor R4 or R5, it is adjusted so as to obtain an output voltage of a desired value.

Further, according to another aspect of the present invention, the resistance values R1, R3 of the resistors R1, R3 are set to be approximately equal.

Moreover, according to another aspect of the present invention, a resistor $R_0$ and a capacitor $C_0$ constituting a filter circuit are provided at the acceleration sensor side from the connection point to which the leakage resistor R1 is connected, and the capacitor $C_0$ is connected in parallel to the acceleration sensor.

Further objects and advantages of the invention can be more fully understood from the following detailed description with reference to the accompanying drawings.

Other features and advantages of the present invention will become apparent from the following description of the invention which refers to the accompanying drawings.

BRIEF DESCRIPTION OF THE DRAWING(S)

DETAILED DESCRIPTION OF EMBODIMENTS OF THE INVENTION

In the following, the present invention will be described in more detail by reference to the attached drawings.

Figure 1:
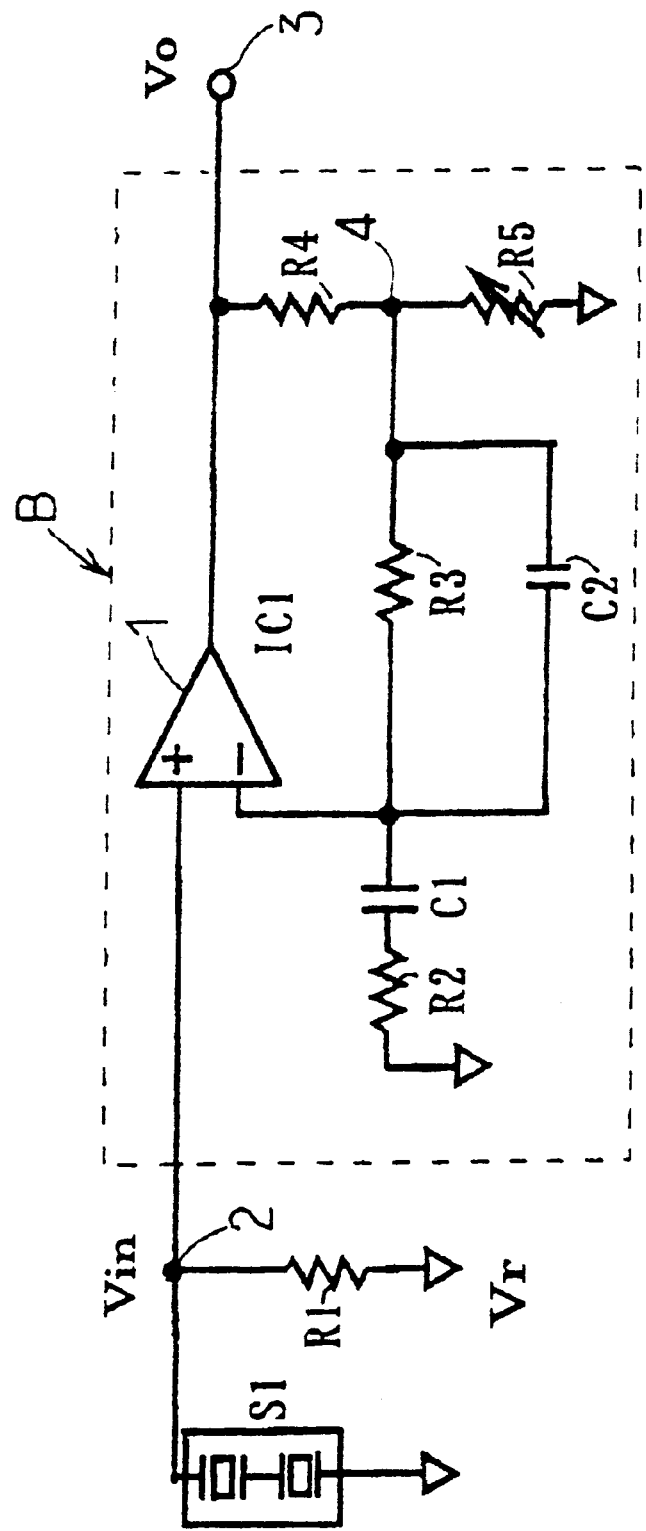
FIG. 1 is a drawing showing a circuit configuration of an amplifier for use in a piezoelectric acceleration sensor according to one embodiment of the present invention.

FIG. 1 is a circuit diagram illustrating an amplifier of a piezoelectric acceleration sensor according to one embodiment of the present invention.

One end of the piezoelectric acceleration sensor S1 is connected to a reference electric potential. The other end of the piezoelectric acceleration sensor S1 is connected to a non-inverting input terminal of an operational amplifier 1. A leakage resistor R1 is connected between a connection point 2 of the acceleration sensor S1 and the non-inverting input terminal of the operational amplifier 1, and the reference electric potential. Further, a capacitor C1 and a resistor R2 are connected in series with each other between the inverting input terminal of the operational amplifier 1 and the reference electric potential. A resistor R4 and a trimming resistor R5 are connected in series with each other between a connection point 4 of an output terminal of the operational amplifier 1 and an output terminal 3, and the reference electric potential. Thus, the voltage at Vo is voltage divided at the connection point 4 is voltage-divided by the resistor R4 and the trimming resistor R5. A resistor R3 and a capacitor C2 are connected in parallel to each other between the connection point 4 of the resistor R4 and the trimming resistor R5, and the inverting input terminal of the operational amplifier 1.

An amplifier of the present embodiment corresponds to the section indicated by a dotted line B of FIG. 1.

Also in the present embodiment, a high pass filter is constituted by a capacitance Cg of the piezoelectric element of the acceleration sensor S1 and the leak resistance R1, and a cut-off frequency $FL_2$ according to this high pass filter is represented in the following equation (5).

$$FL_2 = \frac{1}{2 \times \pi X Cg \times R1} \quad (5)$$

In the amplifier circuit B, a trimming resistor R5 is configured so as to enable adjustment of a resistance value thereof, and by adjusting this resistance value of the trimming resistor R5, an output voltage of a desired value can be obtained. Further, instead of the resistor R5, the resistor R4 may be a trimming resistor and/or other variable resistor.

In the amplifier circuit B, an output voltage of the operational amplifier 1 is voltage-divided by the resistors R4, R5, and then is fed-back to the inverting input terminal. Accordingly, the ratio of the resistance values of the resistor R4, R5, i.e., the voltage-dividing ratio, becomes important.

Since the error becomes larger as the absolute values for the resistance values of the resistors R4, R5 become larger, it is desirable to set these resistances so that the following equation (6) applies.

$$\frac{R4 \times R5}{(R4+R5) \times R2} \ll \frac{C1}{C2} \qquad (6)$$

Further, a gain Bg, a cut off frequency of low-frequency band $FL_b$ (Hz) and a cut off frequency of high-frequency band $FH_b$ (Hz) of the amplifier circuit B are expressed in the following equations (7) to (9).

$$Bg = \frac{Vo}{Vin} = \frac{C1+C2}{C2} \times \frac{R4+R5}{R5} \qquad (7)$$

$$FL_b = \frac{1}{2 \times \pi \times C2 \times R3} \qquad (8)$$

$$FH_b = \frac{1}{2 \times \pi \times R2 \times C1} \qquad (9)$$

Moreover, an output off set voltage V of that depends on a bias current of the operational amplifier 1 is expressed in the following equation (10).

$$Vof = \{(In \times R1) - (Ii \times R3)\} \times \frac{R4+R5}{R5} - Ii \times R4 \qquad (10)$$

In represents a bias current of the non-inverting input of the operational amplifier, and Ii represents a bias current of the inverting input of the operational amplifier.

Accordingly, when assuming the resistance values of the resistors R3, R4 to be R3, R4, and R3 and R4 are set to be R4<<R3, then the following applies:

$$Vof = \{(In \times R1) - (Ii \times R3)\} \times \frac{R4+R5}{R5} \qquad (11)$$

Since the bias current In of the non-inverting input and the bias current Ii of the inverting input are approximately equal, when the resistance values of the resistors R1, R3 are closer, it is understood that the output off set voltage V of becomes smaller. In the present embodiment, it is assumed to be R1=R3.

Further, using a high resistance as the resistor R3, and in order to satisfy the circuit specification, the constants are set as to be described below.

$$C1 \times R2 < C2 \times R3 \qquad (12)$$

By satisfying to satisfy the expression (12), it is apparent from the equation (8) that, if the resistor R3 is a high resistance, the low-frequency cut off frequency $FL_b$ decreases. That is, the bandwidth that can be amplified expands. Accordingly, it is understood that both a reduction of the output off set voltage and an expansion of the bandwidth of the amplifier can be achieved. Also, since a higher resistance value can be selected for R1, it also makes possible to reduce the above-mentioned $FL_2$, and thereby enabling expansion of the bandwidth thereof.

That is, according to the amplifier circuit B of the present embodiment, using one operational amplifier 1, the amplifier circuit B is configured, and further, it enables expanding the bandwidth that can be amplified. As a result, even when the piezoelectric element is miniaturized, it further enables reducing the low-frequency cut off frequency $FL_2$, and it is understood that the miniaturization of the piezoelectric element can be achieved.

In addition, since it may be constituted using only one operational amplifier 1, even when using a high cost operational amplifier of a MOS-FET input type with a small bias current as the operational amplifier 1, it enables reducing the number of parts and the cost thereof.

Next, with reference to FIG. 2, another embodiment will be described. In an amplifier according to the second embodiment shown in FIG. 2, the amplifier circuit B' is constituted substantially similar to the one in the case of the first embodiment. Particularly different points are that a resistor $R_0$ and a capacitor $C_0$ are provided at a front stage of the amplifier circuit B', as well as a self-diagnostic circuit D for diagnosing a fault of the acceleration sensor S1 is provided.

The resistor $R_0$ and the capacitor $C_0$ are provided between an output terminal of the acceleration sensor S1 and a non-inverting input terminal of the operational amplifier 1 of the amplifier circuit B', and the capacitor $C_0$ is connected in parallel to the acceleration sensor S1. That is, a filter is constituted by providing the resistor $R_0$ and the capacitor $C_0$, and as a result thereof, for the piezoelectric element of the acceleration sensor S1, an output voltage can be suppressed, even when an acceleration that is matched with a resonant frequency occurs, and as a result thereof, a malfunction in the amplifier circuit B' can be prevented. Further, it makes possible to perform a temperature compensation of the voltage that is output from the piezoelectric element by the above-mentioned capacitor $C_0$.

Further, in the present embodiment, a first voltage-dividing resistor R6 is connected between the acceleration sensor S1 and the reference electric potential. One end of a second voltage-dividing resistor R7 is connected to a connection point 7 between the acceleration sensor S1 and the first voltage-dividing resistor R6. The second voltage-dividing resistor R7 is a variable resistor, and the other end of the second voltage-dividing resistor R7 is connected to the collector terminal C of a transistor 8, have a PNP transistor. The emitter terminal E of the PNP transistor 8 is connected to a power source voltage Vcc. Further, a resistor R8 is connected between the base terminal B of the PNP transistor and the power source voltage Vcc. Moreover, an external input terminal 9 for use in the fault diagnosis signal input is connected to the base terminal B.

This self-fault diagnostic circuit is provided for early detection of a fault that occurs in the acceleration sensor S1. That is, a timing pulse signal is input to a base terminal B of the PNP transistor 8 from an external input terminal 9 to input the fault diagnosis signal. A signal for a self-diagnosis in a pulse shape, which is synchronized with the above-mentioned timing pulse signal, is input into the acceleration sensor S1 by the PNP transistor 8. That is, the PNP transistor 8 operates as a switching element that outputs a self-diagnosis in a pulse shape, which is synchronized with the above-mentioned timing pulse signal, for the acceleration sensor S1.

One end of the acceleration sensor S1 is connected to the filter circuit in which the above-described resistor $R_0$ and capacitor $C_0$ are provided, but the other end thereof is connected to the reference voltage Vr via the first voltage-dividing resistor R6. A low pass filter is constituted by the capacitance Cg of the piezoelectric element, the capacitance $C_0$ for temperature compensation and the voltage-dividing resistors R6 and $R_0$. Further, a high pass filter is constituted by the capacitance Cg of the piezoelectric element in the acceleration sensor S1, the capacitance $C_0$ and the leakage resistor R1.

Accordingly, in the acceleration sensor of the present embodiment, the first voltage-dividing resistor R6 and the piezoelectric element themselves constitute a filter. According to an input of the above-mentioned timing pulse, the signal for the self-diagnosis in the pulse shape is output from the collector C of the PNP transistor 8 constituting the fault self-diagnosis circuit. Then, the signal for the self-diagnosis in the pulse shape is voltage-divided by the voltage-dividing resistors R6, R7 in which the resistance values thereof are set in advance, and is applied to the acceleration sensor S1.

Then, an output signal from the piezoelectric element is extracted from the output terminal 3 as a sensor output after being processed by the amplifier circuit B'. Accordingly, on the basis of a change in the extracted sensor output, it is judged whether or not there is a fault in the acceleration sensor S1 and/or other parts.

That is, when a fault of the acceleration sensor S1 and the like occurs, the fault may be detected since a voltage waveform of the sensor output varies differently from the one at a normal time.

Figure 2:
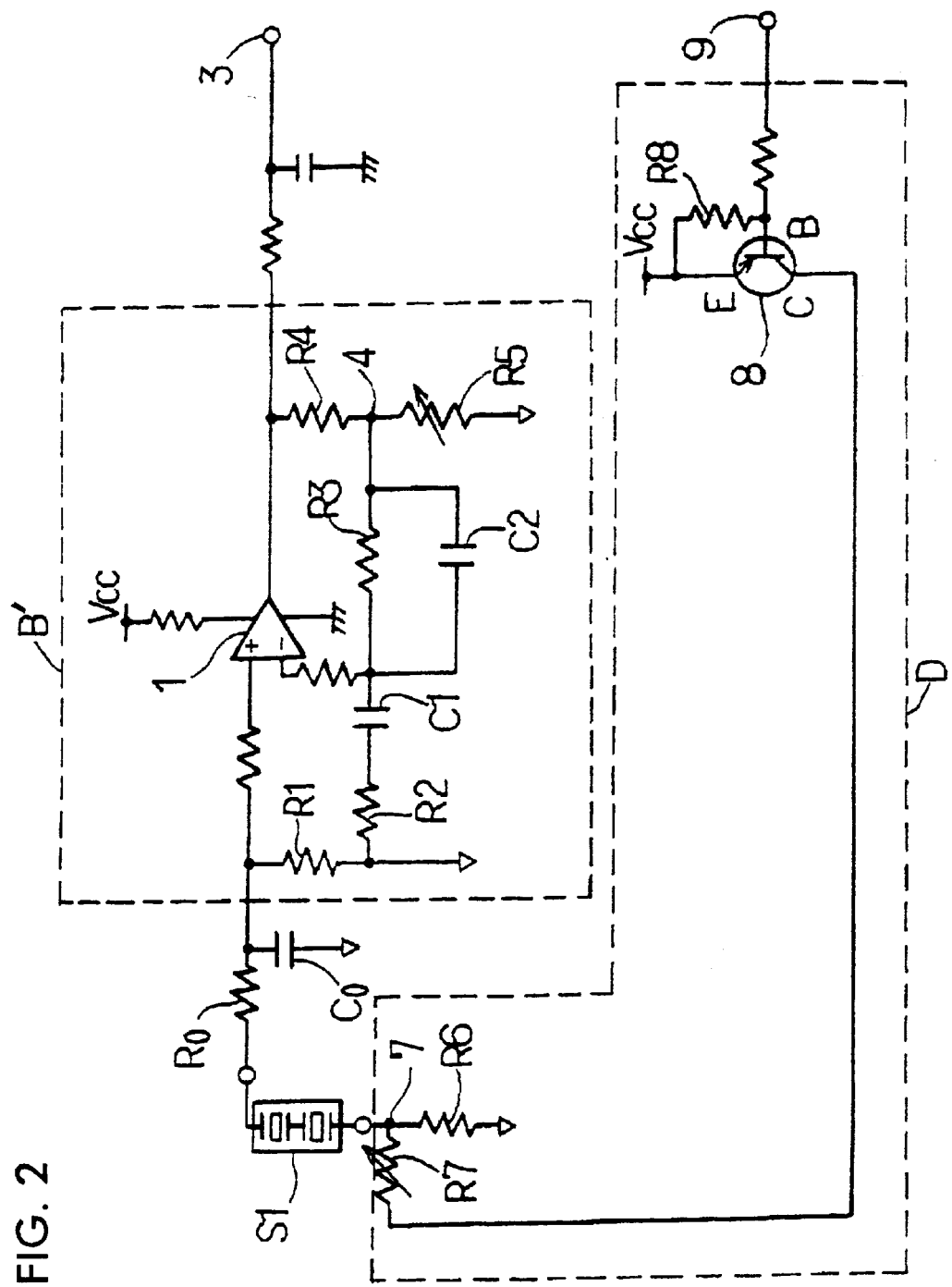
FIG. 2 is a circuit diagram for illustrating an amplifier for use in a piezoelectric acceleration sensor according to a second embodiment of the present invention.

Further, the amplifier circuit B' of the acceleration sensor S1 shown in FIG. 2 is an example of a circuit in a case of detecting an acceleration in one axial direction, but in the present invention, it may be applied to a case of detecting the accelerations that act in two or more axial directions.

Figure 3:
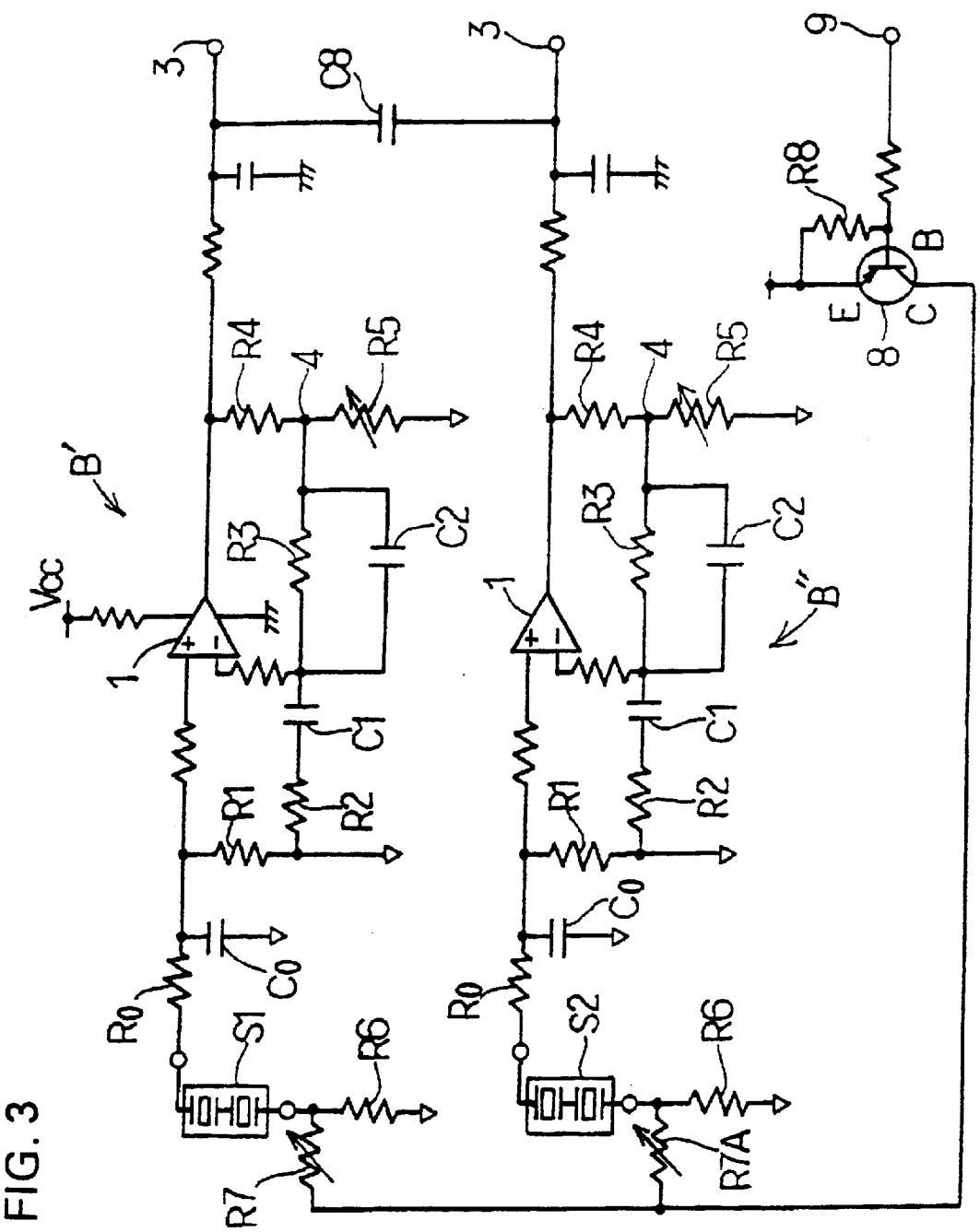
FIG. 3 is a circuit diagram showing an alternative example of the amplifier for use in the acceleration sensor in the embodiment shown in FIG. 2.
Figure 4:
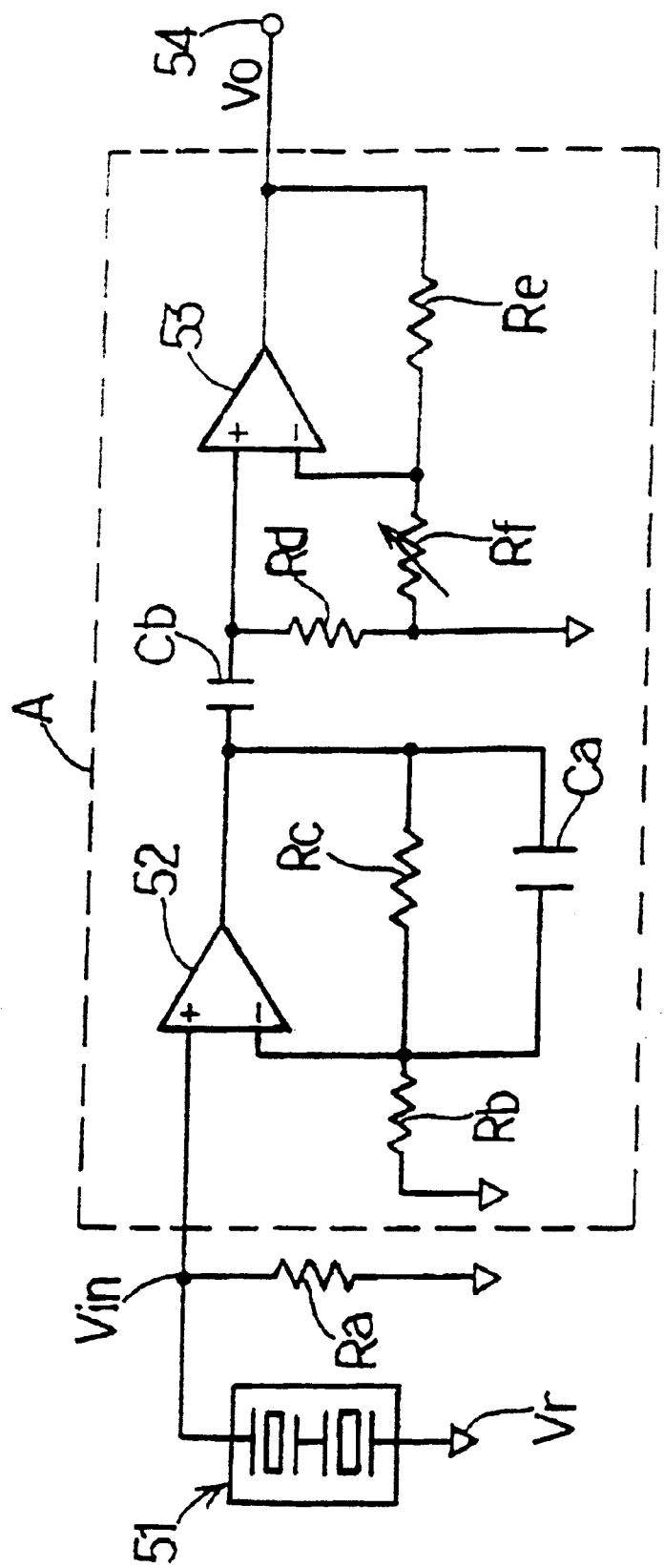
FIG. 4 is a circuit diagram showing one example of a conventional amplifier for use in a piezoelectric acceleration sensor.

FIG. 3 is a circuit diagram showing another embodiment of the amplifier according to the present invention, that is applied to a case of detecting such accelerations in two or more axial directions. Herein, in order to detect the accelerations in two axial directions, an acceleration sensor S2 is used in addition to the acceleration sensor S1. The amplifiers B; B" which are equivalent to the amplifier circuit B shown in FIG. 2 are connected to the acceleration sensors S1, S2, respectively. Further, a capacitor C8 is connected between the amplifiers B' and B".

Moreover, the above-mentioned fault self-diagnosis circuit D is connected to the first and second acceleration sensors S1, S2 via the voltage-dividing resistors R7, R7A, respectively.

In the amplifier for the piezoelectric acceleration sensor according to the present invention, it is arranged such that the leakage resistor R1 is connected between the non-inverting input terminal of the operational amplifier and the reference voltage Vr, and the capacitor C1 and the resistor R2 are connected in series between the inverting input terminal and the reference voltage, R4 and R5 are connected in series with each other between the output terminal of the operational amplifier and the reference voltage, the resistor R3 and the capacitor C2 are connected in parallel with each other between the connection point of the resistors R4, R5 and the inverting input terminal, and the relation of $C1 \times R2 < C2 \times R3$ is satisfied. Thus even when the capacitance of the piezoelectric element becomes smaller by miniaturizing the piezoelectric element, the cut off frequency of the low-frequency band may be reduced, and it will facilitate increasing a resistance value of the leakage resistor R1. As a result, the amplifier for the piezoelectric acceleration sensor has a broader bandwidth.

Moreover, since it is required to use only one operational amplifier, it makes possible to accomplish a reduction of the number of parts and of the cost, as well as to accomplish a miniaturization of the amplifier itself.

Accordingly, it achieves miniaturization of the acceleration sensor, high performance in two axial directions and lower cost.

In the amplifier for the piezoelectric acceleration sensor according to the present invention, when either one of the above-mentioned resistors R4 or R5 comprises a variable resistor, it makes possible easily adjusting an output voltage of the amplifier to a desired amplitude by adjusting the resistance value of the variable resistor.

Further, when making the resistance values R1, R2 of the resistors R1, R2 substantially equal, the output offset voltage due to the bias current of the operational amplifier can be reduced greatly.

In the present invention, the filter circuit is constituted by providing the resistor $R_0$ at the acceleration sensor side from the connection point to which the leakage resistor R1 is connected, and the capacitor $C_0$ as being connected in parallel to the acceleration sensor, between the acceleration sensor and the non-inverting input terminal of the operational amplifier. As a result, even when an acceleration matched with a resonant frequency occurs, an output voltage can be suppressed, and a malfunction of the amplifier can be prevented. Further, by the capacitor $C_0$, it makes possible to perform a temperature compensation of the voltage that is output from the piezoelectric element.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An amplifier for a piezoelectric acceleration sensor for amplifying an output voltage from the piezoelectric acceleration sensor, comprising:

an operational amplifier having a non-inverting input terminal that is connected to an output terminal of the acceleration sensor, an inverting input terminal and an output terminal;

a leakage resistor connected between the non-inverting input terminal of said operational amplifier and a reference voltage;

a first capacitor connected between the inverting input terminal of said operational amplifier and the reference voltage;

a first resistor connected in series with said first capacitor;

first and a second voltage dividing resistors connected in series with each other, between the output terminal of said operational amplifier and the reference voltage; and a second resistor and a second capacitor connected in parallel with each other between a connection point of the first and second voltage dividing resistors and the inverting input terminal of said operational amplifier, wherein, when a capacitance value of said first capacitor is C1, a resistance value of said first resistor is R2, a capacitance value of said second capacitor is C2, and a resistance value of said second resistor is R3, the expression $C1 \times R2 < C2 \times R3$ is satisfied.

2. The amplifier of claim 1, wherein one of said first and second voltage dividing resistors is a variable resistor capable of adjusting a resistance value.

3. The amplifier of claim 1, wherein the resistance values of said leakage resistor and said second resistor are substantially equal.

4. The amplifier of claim 2, wherein the resistance values of said leakage resistor and said second resistor are substantially equal.

5. The amplifier of claim 1, wherein a resistor $R_0$ and a capacitor $C_0$ comprising a filter circuit are coupled to the acceleration sensor at a connection point to which said leakage resistor is connected, and wherein said capacitor $C_0$ is connected in parallel with the acceleration sensor.

6. The amplifier of claim 2, wherein a resistor $R_0$ and a capacitor $C_0$ comprising a filter circuit are coupled to the acceleration sensor at a connection point to which said leakage resistor is connected, and wherein said capacitor $C_0$ is connected in parallel with the acceleration sensor.

7. The amplifier of claim 3, wherein a resistor $R_0$ and a capacitor $C_0$ comprising a filter circuit are coupled to the acceleration sensor at a connection point to which said leakage resistor is connected, and wherein said capacitor $C_0$ is connected in parallel with the acceleration sensor.

8. The amplifier of claim 4, wherein a resistor $R_0$ and a capacitor $C_0$ comprising a filter circuit are coupled to the acceleration sensor at a connection point to which said leakage resistor is connected, and wherein said capacitor $C_0$ is connected in parallel with the acceleration sensor.

9. The amplifier of claim 1, further comprising a self-fault diagnostic circuit coupled to the acceleration sensor for early detection of a fault in the acceleration sensor.

10. The amplifier of claim 9, where the self-fault diagnostic circuit comprises a circuit for receiving a timing pulse as a fault diagnosis signal and providing said timing pulse to the acceleration sensor.

11. The amplifier of claim 10, further comprising a voltage divider circuit for providing the timing pulse to the acceleration sensor.

12. The amplifier of claim 9, wherein the self-fault diagnostic circuit comprises an amplifier circuit for amplifying said timing pulse.

13. The amplifier of claim 1, wherein the operational amplifier comprises a MOS-FET input type operational amplifier.

14. The amplifier of claim 1, further comprising an amplifier for each of two axes of acceleration.

* * * * *